United States Patent
Zhang et al.

(10) Patent No.: US 10,777,811 B2
(45) Date of Patent: Sep. 15, 2020

(54) LITHIUM-SULFUR BATTERY WITH LITHIUM POLYSULFIDE CATHOLYTE

(71) Applicant: UCHICAGO ARGONNE, LLC, Chicago, IL (US)

(72) Inventors: Zhengcheng Zhang, Naperville, IL (US); Zheng Xue, Burr Ridge, IL (US); Feng Zhao, Salt Lake City, UT (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 25 days.

(21) Appl. No.: 15/910,802

(22) Filed: Mar. 2, 2018

(65) Prior Publication Data
US 2019/0273254 A1 Sep. 5, 2019

(51) Int. Cl.
*H01M 4/134* (2010.01)
*H01M 4/36* (2006.01)
(Continued)

(52) U.S. Cl.
CPC ......... *H01M 4/368* (2013.01); *H01M 2/1646* (2013.01); *H01M 2/1653* (2013.01); *H01M 2/1686* (2013.01); *H01M 4/134* (2013.01); *H01M 4/663* (2013.01); *H01M 4/80* (2013.01); *H01M 10/0568* (2013.01); *H01M 10/0569* (2013.01); *H01M 2300/0028* (2013.01)

(58) Field of Classification Search
CPC ............. H01M 2/1646; H01M 2/1653; H01M 2/1686; H01M 4/134; H01M 4/368; H01M 4/663; H01M 4/80; H01M 10/0568; H01M 10/0569
See application file for complete search history.

(56) References Cited

U.S. PATENT DOCUMENTS 4,410,609 A * 10/1983 Peled ...................... H01M 6/16
429/105
5,902,514 A 5/1999 Park et al.
(Continued)

OTHER PUBLICATIONS

Fan, X. et al., Advanced Chemical Strategies for Lithium—Sulfur Batteries: A review; Green Energy & Environment, vol. 3, pp. 2-19 (2018).
(Continued)

*Primary Examiner* — Brittany L Raymond
(74) *Attorney, Agent, or Firm* — Olson & Cepuritis, Ltd.

(57) ABSTRACT

A liquid catholyte for a Li—S battery comprises a non-aqueous solution of at least one lithium polysulfide of formula $Li_2S_x$ (wherein x is selected from 4, 6, and 8) and an anion receptor compound capable of complexing with polysulfide anion. The non-aqueous solution typically is composed of the $Li_2S_x$ and the anion receptor compound dissolved in a non-aqueous solvent (e.g., one or more organic ether or fluorinated ether solvents). The anion receptor compound typically is present in the catholyte at a concentration of about 0.1 M to about 4 M. Li—S batteries comprise a metallic lithium anode; a porous conductive substrate; a separator membrane between the anode and the porous conductive substrate; and the liquid catholyte composition within pores of the substrate.

17 Claims, 3 Drawing Sheets

(51) Int. Cl.
    *H01M 4/38*     (2006.01)
    *H01M 4/66*     (2006.01)
    *H01M 4/80*     (2006.01)
    *H01M 2/16*     (2006.01)
    *H01M 10/0567*     (2010.01)
    *H01M 10/0568*     (2010.01)
    *H01M 10/0569*     (2010.01)

(56) References Cited

U.S. PATENT DOCUMENTS

| | | | | |
|---|---|---|---|---|
| 6,569,573 | B1* | 5/2003 | Mikhaylik | B41J 2/3555 |
| | | | | 29/623.1 |
| 2011/0217595 | A1 | 9/2011 | Kelnberger et al. | |
| 2012/0183866 | A1 | 7/2012 | Lee et al. | |
| 2013/0295471 | A1* | 11/2013 | Visco | H01M 4/86 |
| | | | | 429/405 |
| 2014/0255793 | A1* | 9/2014 | Zhang | C07C 43/2055 |
| | | | | 429/326 |
| 2015/0180000 | A1* | 6/2015 | Roumi | H01M 2/1673 |
| | | | | 429/50 |
| 2016/0118688 | A1* | 4/2016 | Nakanishi | H01M 10/0567 |
| | | | | 429/200 |

OTHER PUBLICATIONS

Lim, D. et al., Route to Sustainable Lithium-Sulfur Batteries With High Practical Capacity Through a Fluorine Free Polysulfide Catholyte and Self-Standing Carbon Nanofiber Membranes, Scientific Reports 7:6327, pp. 1-9 (2017).

\* cited by examiner

A

B

LITHIUM-SULFUR BATTERY WITH LITHIUM POLYSULFIDE CATHOLYTE

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to lithium-sulfur (Li—S) batteries. More particularly, this invention relates to liquid catholytes comprising a lithium polysulfide material and an anion receptor additive in a non-aqueous solvent, as well as Li—S batteries utilizing the liquid catholytes.

BACKGROUND

There is a strong movement to increase the energy density in secondary, rechargeable battery systems. The lithium-sulfur (Li—S) battery is one of the most promising approaches to achieve this goal. The abundant element sulfur can reversibly undergo a two-electron reaction per sulfur atom with lithium to afford $Li_2S$, leading to a high theoretical capacity of about 1675 mAh/g, which is an order of magnitude higher than the capacities of currently used transition-metal oxide cathodes. However, through many years of effort, Li—S batteries are still hampered by short cycle life and low electrochemical utilization of the active material. During the discharge reaction with a lithium metal anode, sulfur first forms a series of lithium polysulfides ($Li_2S_x$, x=8, 6, and 4) and then the final discharge products $Li_2S_2$ or $Li_2S$. The discharged $Li_2S_x$ materials are extremely soluble in the organic electrolytes. Dissolved $Li_2S_x$ migrates to the lithium anode and induces shuttling behavior, which consequently results in the loss of active material and capacity degradation. During the past decade, many attempts have been made to encapsulate $Li_2S_x$ in the cathode through the development of advanced cathode structures and new electrolytes, which do not dissolve $Li_2S_x$. However, these conventional approaches have not been able to effectively prevent the polysulfide dissolution, migration, shuttling, and loss of active material.

Since the dissolution of $Li_2S_x$ and the subsequent consequences could not avoided, the solution to the above problem goes to the other extreme, which is to use a liquid cathode compromising of high concentration $Li_2S_x$ dissolved in a mixture solvents such as 1,3-dioxolane a (DOL) and dimethoxyethane (DME). This way, liquid active materials can sufficiently be utilized via the redox reaction on the conductive carbon substrate. In sulfur-carbon composite solid electrodes, without the dissolution of polysulfides, the reduction of nonconductive sulfur can only occur on the sulfur-carbon interface and the bulk sulfur cannot be utilized, resulting in low specific capacity. By taking advantage of soluble polysulfides, recently a particularly interesting approach that uses liquid-phase lithium polysulfide (so-called catholyte) dispersed onto free-standing conductive matrix as the active cathode material has become attractive. This approach shows facile dispersion and homogeneous distribution of the sulfur active material onto the conductive matrix, which is an improvement over solid C—S cathodes. However, migration of lithium polysulfides to the lithium anode can still result in shuttling effects, while $Li_2S_2$ and $Li_2S$ still can precipitate from the catholyte leading to dramatic capacity loss, as these materials are no longer available for electrochemical cycling. There is an ongoing needs for improved catholyte systems for Li—S batteries. The liquid catholytes and Li—S batteries described herein address this need.

SUMMARY OF THE INVENTION

A liquid catholyte for a Li—S battery comprises a non-aqueous solution of at least one lithium polysulfide of formula $Li_2S_x$ (wherein x is selected from 4, 6, and 8) and an anion receptor compound capable of complexing with polysulfide anion. The non-aqueous solution typically is composed of the $Li_2S_x$ and the anion receptor compound dissolved in a non-aqueous solvent (e.g., one or more organic ether solvents). The $Li_2S_x$ typically is present in the catholyte at a concentration of about 0.5 molar (M) to about 16 M on an elemental sulfur (S) basis; and the anion receptor compound typically is present in the catholyte at a concentration of about 0.1 M to about 4 M. Li—S batteries comprise a metallic lithium anode; a porous conductive substrate; a separator membrane between the anode and the porous conductive substrate; and the liquid catholyte composition within pores of the substrate In a lithium-sulfur battery with utilizing soluble $Li_2S_x$ catholyte in a porous carbon substrate, the $Li_2S_x$ will be gradually be reduced to lower order polysulfides with low capacity and finally to $Li_2S$ with highest capacity. To meet energy density demands, discharge to $Li_2S$ is desired; however, $Li_2S$ tends to precipitate from catholyte solutions and be deposited on the surface of the carbon substrate. The electrical and ionic isolation of $Li_2S$ leads to dead material and loss of active material. This is one of the main reasons for the dramatic capacity fading of Li—S batteries, which has puzzled the field for years. The Li—S batteries described herein address this problem.

In the Li—S batteries described herein, the anion receptor in the catholyte solution has a strong chelating strength toward the polysulfide anion ($S_x^{2-}$) with high exclusivity. The anion receptor-$S_x^{2-}$ complex is electroactive and remains dissolved in the solution throughout the charge and discharge process ensuring the full utilization of the active material, thus affording a Li—S battery with high capacity, high coulombic efficiency, and an extended cycle life relative to conventional Li—S batteries Selected non-limiting embodiments of the catholytes and Li—S batteries described herein are summarized below to illustrate certain features and aspects of the invention or inventions described herein.

Embodiment 1 comprises a liquid catholyte composition for a lithium-sulfur (Li—S) battery, the catholyte comprising: a non-aqueous solution of at least one lithium polysulfide of formula $Li_2S_x$ and an anion receptor compound capable of complexing with polysulfide anion; wherein x is selected from 4, 6, and 8.

Embodiment 2 comprises the composition of Embodiment 1, wherein the non-aqueous solution comprises at least one solvent selected from the group consisting of an organic ether and a fluorinated organic ether.

Embodiment 3 comprises the composition of Embodiment 2, wherein the organic ether solvent comprises at least one solvent selected from the group consisting of 1,3-dioxolane and 1,2-dimethoxyethane.

Embodiment 4 comprises the composition of any one of Embodiments 1 to 3, wherein the anion receptor compound comprises a boron compound of formula $B(X)_3$; wherein each X independently is selected from the group consisting of F, R and OR; each R independently is a hydrocarbyl group; and each hydrocarbyl group independently is unsubstituted or bears one or more halogen substituent.

Embodiment 5 comprises the composition of Embodiment 4, wherein each hydrocarbyl group independently is selected from the group consisting of alkyl, phenyl, phenyl-substituted alkyl, and alkyl-substituted phenyl.

Embodiment 6 comprises the composition of Embodiment 4, wherein the halogen is F.

Embodiment 7 comprises the composition of Embodiment 4, wherein each X independently is selected from the group consisting of F, methyl, ethyl, phenyl, methoxy, ethoxy, phenoxy, fluoro-substituted methyl, fluoro-substituted ethyl, fluoro-substituted phenyl, fluoro-substituted methoxy, fluoro-substituted ethoxy, and fluoro-substituted phenoxy; wherein each fluoro-substituted methyl, fluoro-substituted ethyl, fluoro-substituted phenyl, fluoro-substituted methoxy, fluoro-substituted ethoxy, and fluoro-substituted phenoxy group comprises at least one fluoro substituent.

Embodiment 8 comprises the composition of any one of Embodiments 4 to 7, wherein each X independently is selected from the group consisting of F, methyl, ethyl, phenyl, methoxy, ethoxy, phenoxy, trifluoromethyl, trifluoromethoxy, pentafluoroethyl, pentafluoroethoxy, pentafluorophenyl, pentafluorophenoxy, 2,2,2-trifluoroethyl, and 2,2,2-trifluoroethoxy.

Embodiment 9 comprises the composition of any one of Embodiments 4 to 8, wherein each X is identical.

Embodiment 10 comprises the composition of any one of Embodiments 4 to 9, wherein the anion receptor compound is selected from the group consisting of $BF_3$, $B(CH_2CH_3)_3$, $B(OCH_3)_3$, $B(OCH_2CH_3)_3$, $B(OCF_3)_3$, $B(OCH_2CF_3)_3$, $B(C_6F_5)_3$, and $B(OC_6F_5)_3$.

Embodiment 11 comprises the composition of any one of Embodiments 1 to 10, wherein the non-aqueous solution further comprises another soluble lithium salt in addition to the lithium polysulfide, such as lithium nitrate or lithium trifluoromethanesulfonate.

Embodiment 12 comprises the composition of any one of Embodiments 1 to 11, wherein the anion receptor compound is present in the solution at a concentration in the range of about 0.1 M to about 4 M.

Embodiment 13 comprises the composition of any one of Embodiments 1 to 12, wherein the lithium polysulfide is present in the solution at a concentration in the range of about 0.5 M to about 16 M on an elemental sulfur basis.

Embodiment 14 comprises a lithium-sulfur (Li—S) battery comprising:
(a) an anode comprising metallic lithium;
(b) a porous conductive substrate;
(c) a separator membrane between and contacting the anode and the porous conductive substrate; and
(d) the liquid catholyte composition of any one of Embodiments 1 to 13 within pores of the porous conductive substrate.

Embodiment 15 comprises the battery of Embodiment 14, wherein the porous conductive substrate comprises a porous carbon material.

Embodiment 16 comprises the battery of any one of Embodiments 14 and 15, wherein the porous separator membrane comprises a layer of a porous polyolefin membrane and a layer of a LISICON ceramic membrane.

The liquid catholyte compositions and Li—S batteries described herein provide a number of advantages over current Li-s battery designs. In particular, the catholyte utilizes soluble lithium polysulfides complexed with an anion receptor. Such complexes are electroactive an remain dissolved in the catholyte solution throughout the charge-discharge cycle, ensuring full utilization of the active material. The Li—S batteries described herein have high capacity, high coulombic efficiency and an extended cycle life.

DETAILED DESCRIPTION OF PREFERRED EMBODIMENTS

Figure 1:
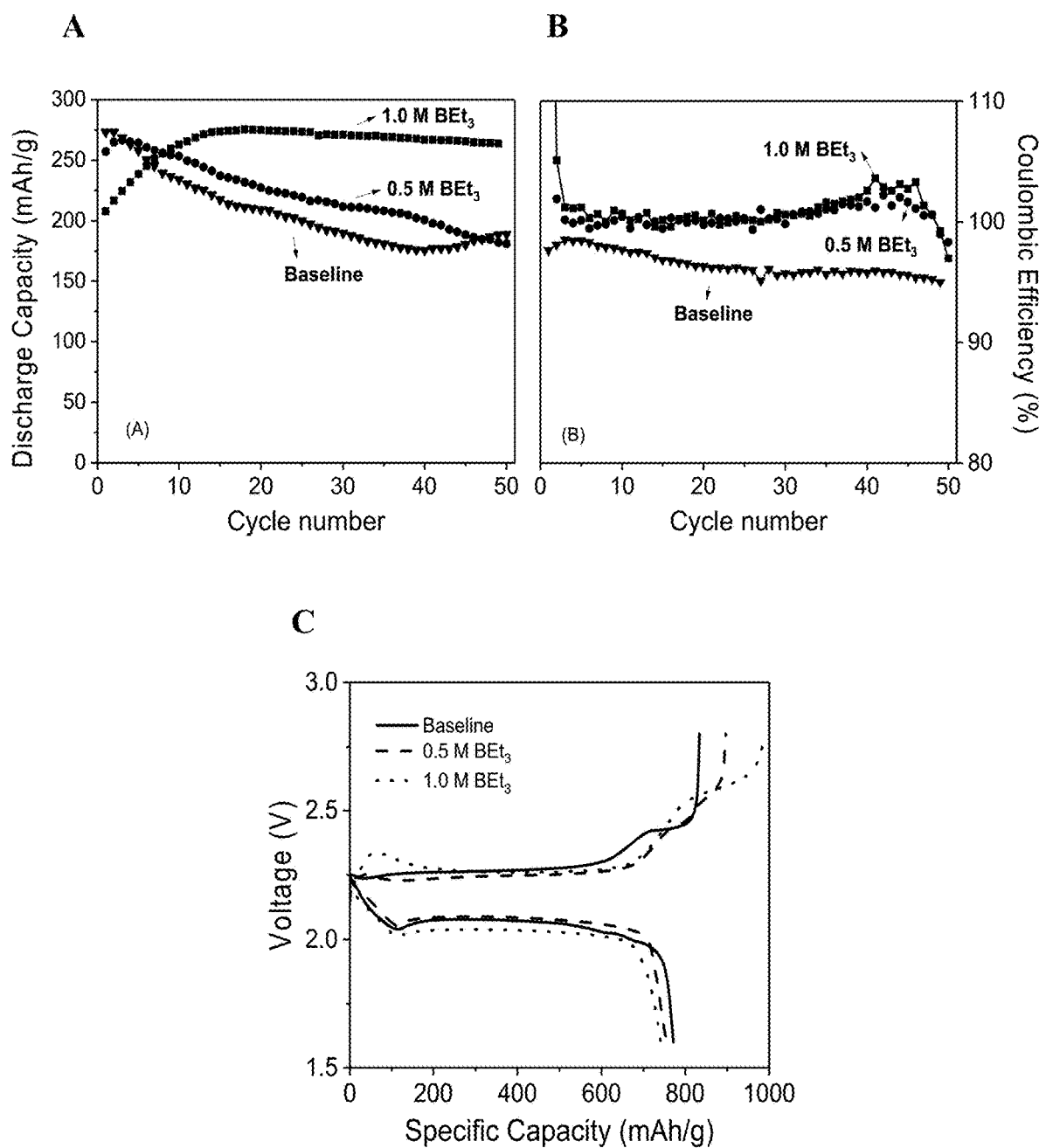
FIG. 1 provides graphs of (A) capacity retention, (B) coulombic efficiency, and (C) first cycle voltage profiles, of Li-S batteries comprising baseline $Li_2S_x$ catholyte (no anion receptor) compared to batteries comprising catholytes including 0.5 M or 1.0 M $BEt_3$ anion receptor cycled between 2.8 v to 2.1 V.

Liquid catholytes for Li—S batteries are described herein. The catholytes comprise a non-aqueous solution of at least one lithium polysulfide of formula $Li_2S_x$ (wherein x is selected from 4, 6, and 8) and an anion receptor compound capable of complexing with polysulfide anion (e.g., an anion receptor compound of formula $B(X)_3$, wherein each X independently is selected from F, R and OR; each R independently is a hydrocarbyl group; and each hydrocarbyl group independently is unsubstituted or bears one or more halogen substituent). The non-aqueous solution typically is composed of the $Li_2S_x$ and the anion receptor compound dissolved in a non-aqueous solvent (e.g., one or more organic ether solvents).

The lithium polysulfide component of the catholyte comprises one or more lithium polysulfide compound of formula $Li_2S_x$, wherein x is 4, 6, or 8, which is soluble in a non-aqueous solvent. Typically, the lithium polysulfide component is present in the catholyte at a concentration in the range of about 0.5 M to about 16 M (e.g., about 1 M to about 14 M; about 2 M to about 12 M; or about 3 M to about 10 M) on an elemental sulfur basis.

Non-limiting examples of non-aqueous solvents for use in the catholyte compositions include one or more solvent selected from an ether, a fluorinated ether, a carbonate ester, a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether such as 1,3-dioxolane, 1,2-dimethoxyethane (also known as glyme), or diglyme; a linear dialkyl carbonate such as dimethyl carbonate (DMC), diethyl carbonate (DEC), ethyl methyl carbonate (EMC) and the like; a cyclic alkylene carbonate such as ethylene carbonate (EC), propylene carbonate (PC) and the like; a sulfolane such as sulfolane or an alkyl-substituted sulfolane; or a sulfone such as a dialkyl sulfone (e.g. methyl ethyl sulfone).

Preferably the solvent comprises an organic ether or a fluorinated organic ether. Non-limiting examples of fluorinated organic ethers include, e.g., compounds represented as R'—O—R", where R' is a partially fluorinated or perfluorinated alkyl group, and R" is a partially fluorinated or perfluorinated alkyl group, R' and R" optionally can include additional oxygen atoms in the alkyl chain or a substituent, as in a partially or perfluorinated ether group. For example, either or both of R' and R" may be a partially fluorinated or perfluorinated polyethylene glycol, polypropylene glycol, or polybutylene glycol residue. Illustrative non-polar fluorinated ether solvents include, but are not limited to 1,1,2,2-tetrafluoroethyl-2,2,3,3-tetrafluoropropyl ether (TTE); 1,1,2,2-tetrafluoroethyl-2,2,3,3,3-pentafluoropropyl ether; 2,2,2-trisfluoroethyl-1,1,2,3,3,3-hexafluoropropyl ether; ethyl-1,1,2,3,3,3-hexafluoropropyl ether; difluoromethyl-2,2,3,3,3-pentafluoropropyl ether; and difluoromethyl-2,2,3,3-tetrafluoropropyl ether. In some cases, R' and R" are linked together to form a cyclic fluorinated ether. The solvent can comprise a single solvent compound or a mixture of two or more solvent compounds.

Anion acceptor compounds are materials that can coordinate or complex with polysulfide anions such as $S_4^{2-}$, $S_6^{2-}$, and $S_8^{2-}$, and include, e.g., Lewis acids such as trivalent boron compounds. In some embodiments, the anion receptor compounds are boron compounds of formula $B(X)_3$; wherein each X independently is selected from the group consisting of F, R and OR; each R independently is a hydrocarbyl group; and each hydrocarbyl group independently is unsubstituted or bears one or more halogen substituent (e.g., Cl or F; preferably F). In some embodiments, each hydrocarbyl group independently is selected from the group consisting of alkyl (e.g., $C_1$ to $C_6$ alkyl, such as methyl, ethyl, propyl and the like), phenyl, phenyl-substituted alkyl (e.g., a $C_1$ to $C_6$ alkyl bearing one or more phenyl substituent, such as benzyl, 2-phenylethyl, and the like), and alkyl-substituted phenyl (e.g., a phenyl substituted by one or more $C_1$ to $C_6$ alkyl group, such as 4-methylphenyl, 2,4,6-trimethylphenyl, and the like). In some embodiments, each X independently is selected from the group consisting of F, methyl, ethyl, phenyl, methoxy, ethoxy, phenoxy, fluoro-substituted methyl (e.g., fluoromethyl, difluoromethyl or trifluoromethyl), fluoro-substituted ethyl (e.g., an ethyl group bearing 1 to 5 fluoro substituents, such as 2,2,2-trifluoroethyl, pentafluoroethyl, and the like), fluoro-substituted phenyl (e.g., 4-fluorophenyl, 2-fluorophenyl, pentafluorophenyl, and the like), fluoro-substituted methoxy (e.g., fluoromethoxy, difluoromethoxy, or trifluoromethoxy), fluoro-substituted ethoxy (e.g., an ethoxy group bearing 1 to 5 fluoro substituents, such as 2,2,2-trifluoroethoxy, pentafluoroethoxy, and the like), and fluoro-substituted phenoxy (e.g., 4-fluorophenoxy, 2-fluorophenoxy, pentafluorophenoxy, and the like); wherein each fluoro-substituted methyl, fluoro-substituted ethyl, fluoro-substituted phenyl, fluoro-substituted methoxy, fluoro-substituted ethoxy, and fluoro-substituted phenoxy group comprises at least one fluoro substituent. Each X of the $BX_3$ compound can be different or identical. In some embodiments, the $BX_3$ compound is selected from the group consisting of $BF_3$, $B(CH_2CH_3)_3$, $B(OCH_3)_3$, $B(OCH_2CH_3)_3$, $B(OCF_3)_3$, $B(OCH_2CF_3)_3$, $B(C_6F_5)_3$, and $B(OC_6F_5)_3$.

The anion receptor compound typically is present in the catholyte at a concentration in the range of about 0.1 M to about 4 M, e.g., about 0.2 M to about 2 M, or about 0.5 M to about 1 M.

A Li—S battery as described herein comprises a metallic lithium-containing anode; a porous conductive substrate; a separator membrane between and contacting the anode and the porous conductive substrate; and a liquid catholyte composition as described herein within pores of the substrate.

Non-limiting examples of porous conductive substrates include porous carbon materials such as carbon paper, carbon cloth, carbon fiber, and porous graphitic carbon, as well as other porous materials such as nickel foam and aluminum foam.

Non-limiting examples of separator membranes include microporous polymeric membrane, such as CELGARD brand membranes (e.g., microporous polypropylene membranes, or microporous polypropylene/polyethylene/polypropylene membranes and the like); as well as solid LISICON ceramic membranes. LISICON is an acronym for LIthium Super Ionic CONductor, which refers to a family of solid solution materials with the chemical formula $Li_{2+2n}Zn_{1-n}GeO_4$ and similar compositions comprising other combinations of metal ions an metal oxides, which are characterized by high lithium ion conductivities due to movement of Li ions among interstitial sites of the LISICON crystal lattice, allowing for lithium ion conductivity without being porous materials. Other materials within the LISICON family are related to the $\gamma$-$Li_3PO_4$ structure and are composed of lithiated $GeO_4$, $SiO_4$, $PO_4$, $ZnO_4$ or $VO_4$ tetrahedra.

In some embodiments, the catholyte of the Li—S battery can include a soluble lithium salt such as lithium nitrate, lithium trifluoromethanesulfonate (also known as lithium triflate or LiOTf), and the like, as a passivating agent for the metallic lithium anode. The lithium salt, when present, typically is included at a concentration in the range of about 0.05 M to about 3 M. Generally, lithium salt is included when the catholyte will be used in a Li—S battery that utilizes a microporous separator membrane that allows passage of lithium polysulfide through the membrane to contact the metallic lithium anode. Side reactions between the lithium polysulfide and lithium metal can be ameliorated by passivation with lithium salt. The lithium salt can be omitted, if desired, when the separator membrane of the battery excludes passage of lithium polysulfide, such as solid ceramic LISICON membranes.

The following non-limiting examples are provided to illustrate certain aspects and features of the solvent compositions, electrolytes, electrochemical cells, and batteries described herein.

EXAMPLES

Ex. 1. Catholytes and Li—S Batteries

Coin cells (2032-type) were constructed under an inert atmosphere. The cell components were stacked in the following order and sealed in a 2032 coin cell housing: a spacer, nanofiber carbon paper (1 cm$^2$) imbibed with the liquid catholyte (about 20 µL), a ceramic (LISICON) membrane (190 µm thick), a CELGARD 3501 porous polypropylene membrane, and an anode comprising lithium metal dispersed in a nickel foam substrate. Baseline catholyte (for comparison) comprised about 4 M $Li_2S_6$ (on an elemental sulfur basis), and 0.5 M LiOTf in 1:1 (w/w) DOL:DME. Two exemplary catholytes according to the present invention were tested, which were comprised of the baseline catholyte containing 1.0 M $B(OEt)_3$, 0.5M $BEt_3$, or 1.0 M $BEt_3$ as the anion receptor. The catholyte solutions were prepared by dissolving the lithium polysulfide (LiPS), lithium triflate and the anion receptor (when present) in the DOL/DME (1:1) solvent by heating at a temperature of about 50 to 60° C. with agitation overnight in an Ar-filled glove box.

Ex. 2. Electrochemical Evaluation of Li—S Batteries

2032-Type coin cells were cycled between 2.8-1.6 V with a current of C/20 (discharge first). The charge and discharge capacity was obtained for each cycle and plotted with cycling number as shown in the capacity figure to show the cycling stability. The Coulombic efficiency is calculated as the discharge capacity divided by the charge capacity.

FIG. 1 provides graphs of (A) capacity retention, (B) coulombic efficiency, and (C) first cycle voltage profiles, of Li—S batteries comprising baseline $Li_2S_x$ catholyte (no anion receptor) compared to batteries comprising catholytes including 0.5 M $BEt_3$ or 1.0 M $BEt_3$ anion receptors cycled between 2.8 v to 2.1 V. The results in FIG. 1 show that when cycled at C/20 current rate between 2.8 V and 1.6 V, the cells containing $BEt_3$ showed similar 1st cycle specific capacity compared with the baseline cell; see FIG. 1, panel (C). Capacity contribution from the 3rd plateau associated with the LiPS-$BEt_3$ complex was higher when the concentration of $BEt_3$ was increased in the catholyte; see FIG. 1, panel (C). However, it was found that with the current cell configuration, continuous cycling of all cells between 2.8 and 1.6 V was not successful, which is partially due to the degradation of LATP membrane during cycling. When the voltage window was set between 2.8 and 2.1V, the cells could in general be cycled up to 50 cycles. By limiting the voltage window, the cell containing 1.0 M $BEt_3$ showed better performance than the cell with 0.5 M $BEt_3$ and the baseline cell.

Figure 2:
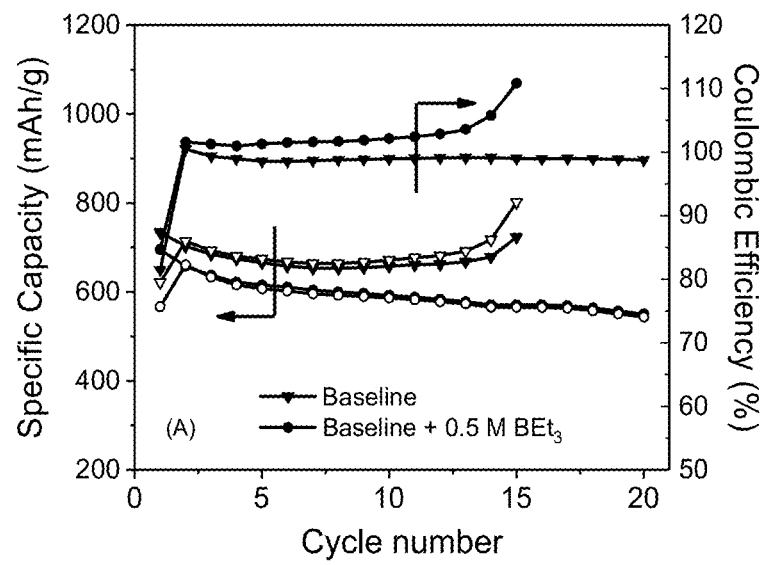
FIG. 2 provides graphs of capacity retention and coulombic efficiency for a Li—S battery using a $Li_2S_x$ catholyte including 0.5 M $BEt_3$ anion receptor compared to a battery using baseline catholyte (no anion receptor), cycled between 2.8 V to 1.6 V at a C/5 rate (A); and graphs of capacity retention for Li—S batteries using the $Li_2S_x$ catholyte including 0.5 M $BEt_3$ or 0.5 M triethylborate ($BOEt_3$) anion receptor compared to a battery using baseline catholyte (no anion receptor), cycled between 2.8 V to 1.6 V at a C/10 rate (B).
Figure 2:
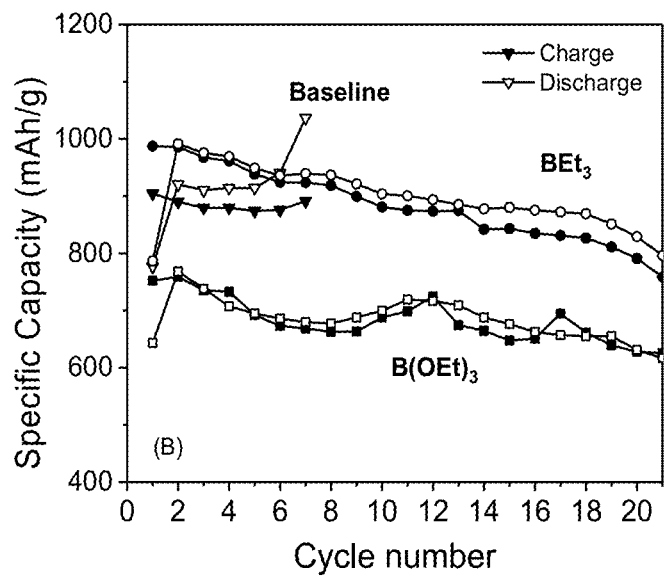

FIG. 2 provides graphs of capacity retention and coulombic efficiency for a Li—S battery using a $Li_2S_x$ catholyte including 0.5 M $BEt_3$ anion receptor compared to a battery using baseline catholyte (no anion receptor), cycled between 2.8 V to 1.6 V at a C/5 rate (A); and graphs of capacity retention for Li—S batteries using the $Li_2S_x$ catholyte including 0.5 M $BEt_3$ or 0.5 M triethylborate ($BOEt_3$) anion receptor compared to a battery using baseline catholyte (no anion receptor), cycled between 2.8 V to 1.6 V at a C/10 rate (B). The results in FIG. 2 show that both anion receptors were able to maintain good cycling performance by suppressing shuttling effect, presumably via complexing with the active $Li_2S_x$ species in the solution.

Interfacial impedance of Li—S batteries were also evaluated. A cell utilizing a catholyte comprising $Li_2S_x$ and 0.5 M triethylborane ($BEt_3$) was compared to a cell with the same catholyte composition but lacking the $BEt_3$ (baseline catholyte). The cells were cycled between 2.8 V to 1.6 V. The cell with the $BEt_3$-containing catholyte exhibited lower AC impedance in the medium frequency range relative to the cell with the baseline catholyte, which increased at the end of the charge. These impedance results indicate that $BEt_3$ was able to decrease the extent to which inactive species forms on the surface of the porous carbon substrate.

Ex. 3. Exemplary Li—S Battery Design

Figure 3:
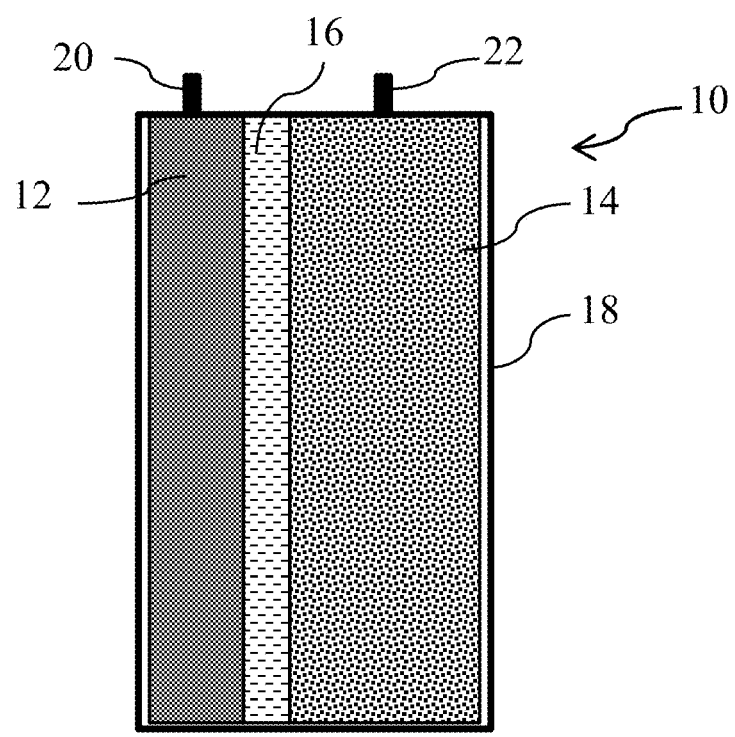
FIG. 3 provides a schematic representation of a Li—S battery as described herein.

FIG. 3 schematically illustrates a cross-sectional view of lithium-sulfur (Li—S) battery 10 comprising metallic lithium-containing anode 12 (e.g., Li metal foil, or metallic Li dispersed in a porous material such as nickel foam), and porous conductive substrate 14 (e.g., a porous carbon substrate), with lithium-conductive separator membrane 16 (e.g., a porous polyolefin membrane, a dense LISICON membrane or both) therebetween. A catholyte comprising a solution of a lithium polysulfide and an anion receptor compound in a non-aqueous solvent as described herein is present within porous substrate 14. The entire battery is sealed within a housing 18 and includes electrical leads 20 and 22 contacting anode 12 and porous substrate 14, respectively.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid catholyte composition for a lithium-sulfur (Li—S) battery, the catholyte comprising: a non-aqueous solution of at least one lithium polysulfide of formula $Li_2S_x$ and an anion receptor compound capable of complexing with polysulfide anion; wherein x is selected from 4, 6, and 8; the anion receptor compound comprises a boron compound of formula $B(X)_3$, wherein each X independently is an unsubstituted $C_1$ to $C_6$ alkyl.

2. The composition of claim 1, wherein the non-aqueous solution comprises at least one solvent selected from the group consisting of an organic ether and a fluorinated organic ether.

3. The composition of claim 2, wherein the organic ether solvent comprises at least one solvent selected from the group consisting of 1,3-dioxolane and 1,2-dimethoxyethane.

4. The composition of claim 1, wherein each X is identical.

5. The composition of claim 1, wherein the anion receptor compound is $B(CH_2CH_3)_3$.

6. The composition of claim 1, wherein the non-aqueous solution further comprises another soluble lithium salt in addition to the lithium polysulfide.

7. The composition of claim 1, wherein the anion receptor compound is present in the solution at a concentration in the range of about 0.1 molar (M) to about 4 M.

8. The composition of claim 1, wherein the lithium polysulfide is present in the solution at a concentration in the range of about 0.5 M to about 16 M on an elemental sulfur basis.

9. The composition of claim 1, wherein each X independently is selected from the group consisting of methyl and ethyl.

10. A lithium-sulfur (Li—S) battery comprising:
(a) an anode comprising metallic lithium;
(b) a porous conductive substrate;
(c) a separator membrane between and contacting the anode and the porous conductive substrate; and
(d) a liquid catholyte composition within pores of the porous conductive substrate; wherein the catholyte solution comprises a non-aqueous solution of at least one lithium polysulfide of formula $Li_2S_x$ and an anion receptor compound capable of complexing with polysulfide anion; wherein x is selected from 4, 6, and 8; the anion receptor compound comprises a boron compound of formula $B(X)_3$, wherein each X independently is an unsubstituted $C_1$ to $C_6$ alkyl.

11. The battery of claim 10, wherein the non-aqueous solution comprises at least one solvent selected from the group consisting of an organic ether and a fluorinated organic ether.

12. The battery of claim 11, wherein the organic ether solvent comprises at least one solvent selected from the group consisting of 1,3-dioxolane and 1,2-dimethoxyethane.

13. The battery of claim 10, wherein the non-aqueous solution further comprises another soluble lithium salt in addition to the lithium polysulfide.

14. The battery of claim 10, wherein the anion receptor compound is present in the solution at a concentration in the range of about 0.1 M to about 4 M.

15. The battery of claim 10, wherein the lithium polysulfide is present in the solution at a concentration in the range of about 0.5 M to about 16 M on an elemental sulfur basis.

16. The battery of claim 10, wherein the porous conductive substrate comprises a porous carbon material.

17. The battery of claim 10, wherein the porous separator membrane comprises a layer of a porous polyolefin membrane and a layer of a LISICON ceramic membrane.

* * * * *